US005711512A

United States Patent [19]

Kauffman

[11] Patent Number: 5,711,512

[45] Date of Patent: Jan. 27, 1998

[54] LIFTING JACK

[75] Inventor: Leonard S. Kauffman, Langley, Okla.

[73] Assignee: Malcom P. Hammond, Tulsa, Okla.; a part interest

[21] Appl. No.: 706,735

[22] Filed: Sep. 9, 1996

[51] Int. Cl.[6] .......... B60P 1/00

[52] U.S. Cl. .......... 254/2 B; 254/93 R; 254/93 L; 254/129; 254/130; 254/131.5; 254/134

[58] Field of Search .......... 254/2 B, 6 B, 254/8 B, 93 R, 93 L, 95, 133 R, 134, 131, 124, 3 B, 129, 130; 414/444, 450, 490; 280/47.18, 47.24, 47.29, 763.1

[56] References Cited

U.S. PATENT DOCUMENTS

| | | | |
|---|---|---|---|
| 652,836 | 7/1900 | Covert . | |
| 833,331 | 10/1906 | Michaelis | 254/133 R |
| 1,554,120 | 9/1925 | Mosher | 254/134 |
| 2,469,670 | 5/1949 | Thompson | 254/133 |
| 2,684,129 | 7/1954 | Jaseph | 254/93 L |
| 2,786,650 | 3/1957 | Bottorff | 254/134 |
| 2,867,409 | 1/1959 | Southerwick | 254/2 |
| 2,937,002 | 5/1960 | Schultz | 254/93 |
| 2,947,513 | 8/1960 | Nolden et al. | 254/2 |
| 3,117,764 | 1/1964 | Schultz et al. | 254/2 |
| 3,165,295 | 1/1965 | Nolden | 254/2 |
| 3,647,183 | 3/1972 | Rishovd | 254/2 B |
| 3,768,778 | 10/1973 | Ames | 254/2 B |
| 3,869,149 | 3/1975 | Dixon | 280/763.1 |

*Primary Examiner*—Timothy V. Eley
*Assistant Examiner*—Lee Wilson
*Attorney, Agent, or Firm*—John D. Gassett; Frank J. Catalano; Scott R. Zingerman

[57] ABSTRACT

A lifting jack for raising boats and other objects. It has an inner housing or tube which is supported from a flat base. An outer tube is slidably mounted over the inner tube. A hydraulic jack inside the inner tube raises and lowers the outer tube. Two parallel series of vertical catches are supported on the outside of the outer tube. A selected pair of these catches support a connecting rod which holds a pair of flat support arms in a fixed relationship. The arms support a lifting pad in a plurality of elevations for each pair of vertical catches. A safety latch permits the outer housing to be raised but must be manually released for lowering.

12 Claims, 7 Drawing Sheets

LIFTING JACK

This invention relates generally to lifting apparatus and more particularly to heavy duty jacks such as hydraulic for lifting relatively bulky objects such as boats.

BACKGROUND OF THE INVENTION

Hydraulic jacks are well known and are used for many various and assorted purposes. For example, they are used to lift boats, automobiles, tractors, airplanes and practically anything else that needs lifting. These normally include a hydraulic pump either manually or motor driven, to force a piston in the cylinder in an upward direction. The piston is connected to an extension rod or shaft to contact the load to be lifted. In the simplest of hydraulic jacks a lifting head is attached directly to the top of the extension rod and is placed under the object to be lifted. One problem which arises from this common type jack is that frequently a large portion of the lift stroke is required merely to make contact with the load. For example, if fifteen inches of the range of lift of twenty inches of the jack is required just to make contact with the hull of a boat then the boat can be lifted only five inches after contact is made. That particular problem has been addressed in the past by providing a lift carriage of step configuration to provide a plurality of lifting shelves at different levels. If three shelves are included then there is only three level adjustment positions. To obtain other level adjustment position extra parts are required.

Although the prior art systems were helpful in limiting the amount of travel of the lifting jack in order to make contact with the object to be lifted, it does not provide smaller increments and adjustments as is frequently desired. The present invention provides an apparatus having a structure with a wide range of height adjustment which minimizes the amount of travel of the jack required just to obtain contact.

SUMMARY OF THE INVENTION:

This discloses a jack assembly which has a relatively flat base which supports an inner tube or housing which is secured thereto. Another tube slides up and down over the inner tube. Rollers are provided to facilitate the movement of the outer tube up and down the outer walls of the inner tube. A jack such as a hydraulic jack is contained inside the inner tube and is secured to the base. The pump has an extension rod or shaft which is connected to the outer tube and as the shaft moves up and down it moves the outer tube with it. The jack pump can be operated by a foot lever or a hand lever.

The outer and inner tubes are typically rectangular in cross-section. Along each of the two front edges of the outer tube is a line of vertical support catches.

A support arm unit is provided and includes two spaced apart flat arms each having a front portion and a rear portion. A support red in the front portion and a rear support bar in the rear portion connects the two support arms together in a fixed relationship. The outer tube fits between the two spaced apart support arms and the support rod fits into a selected one of the support catches of each series. The rear edge of the support arms are each provided with a series of adjustment holes which are preferably aligned on the arc of a circle. A hole selection rod is placed through a selected adjustment hole of each support arm. The front portions of the support arms support a lifting pad which in operation is placed under the object being lifted, i.e., a boat. When the support rod is placed in a selected pair of catches the two support arms will rotate about it until the hole selection rod (or rear support bar if no selection rod is used) contacts the rear side of the outer tube. The rotation of the support arms about the support rod raises and lowers the height of the lifting pad for the support catches in which the support rod is positioned. If, for example, there are seven adjustment holes in the support arms, then for each catch level there are seven different heights or levels available for the lift pad. This provides a wide range of height selection for the lifting pad. For example, if there are seven holes in the rear of each support arms, there are seven increments of elevation for each pair of catch. If there are eleven pair of catches, that provides seventy-seven increments in height elevation.

This jack assembly also includes a safety latching device between the outer and inner tubes. This safety latching device will automatically catch when lowering and will self-release while being raised. When the device is being lowered, the latch must be manually released. This prevents inadvertent lowering of the jack in case of fluid failure for example.

It is thus an object of the invention to provide a lifting jack assembly which has a wide range of adjustments of levels for the lifting pad.

It is another object of the invention to provide a safety latching device which is automatically applied while the jack is being lifted but must be manually released when the jack is lowered.

BRIEF DESCRIPTION OF THE DRAWING

These and other objects will become apparent in conjunction with the detailed description when taken in conjunction with the drawings in which.

DETAILED DESCRIPTION OF THE INVENTION

Figure 1:
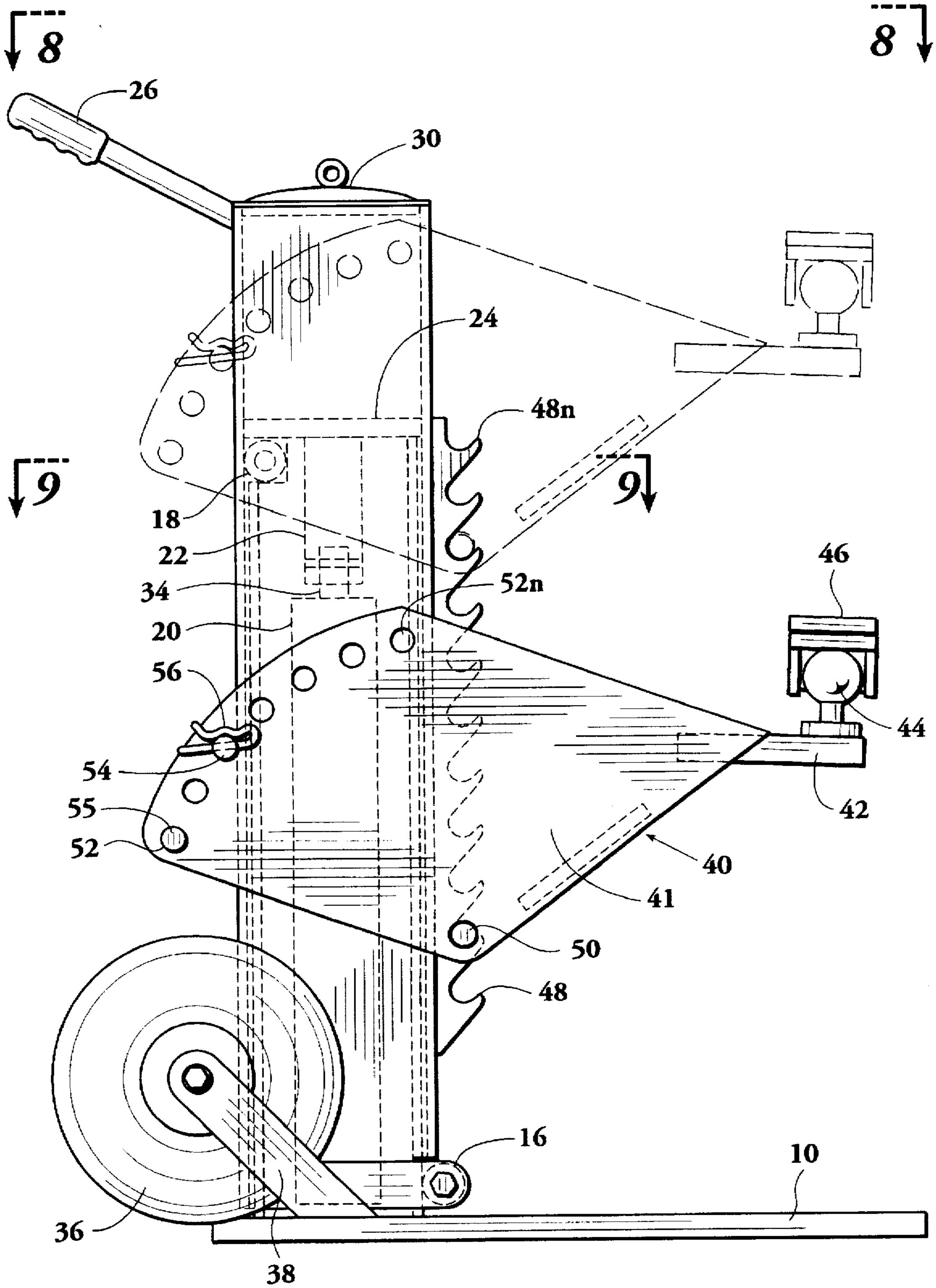
FIG. 1 is a side elevation view showing the primary lifting features of the invention.
Figure 2:
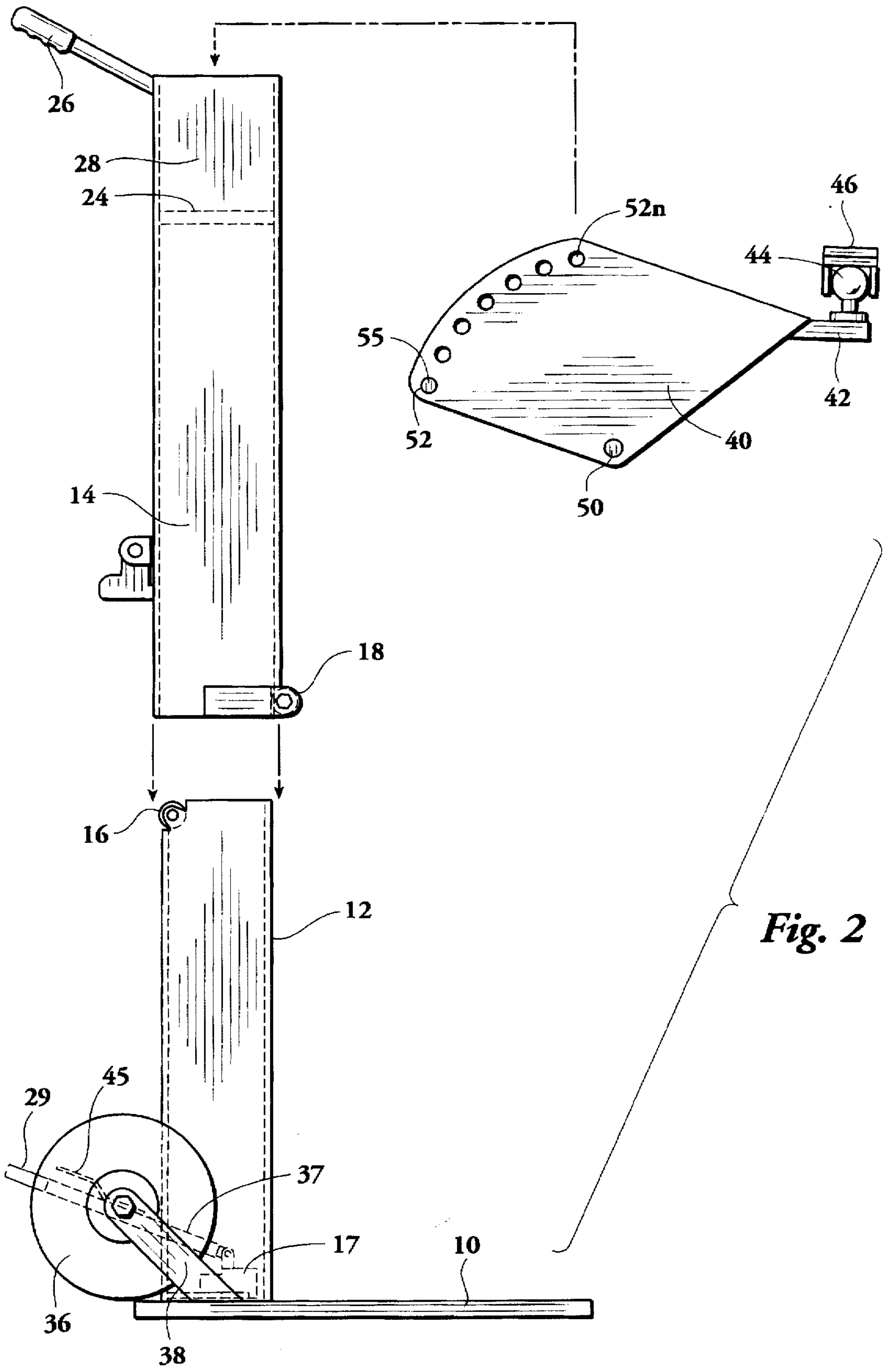
FIG. 2 is an exploded view of the inner tube, the outer tube and the support unit.
Figure 4:
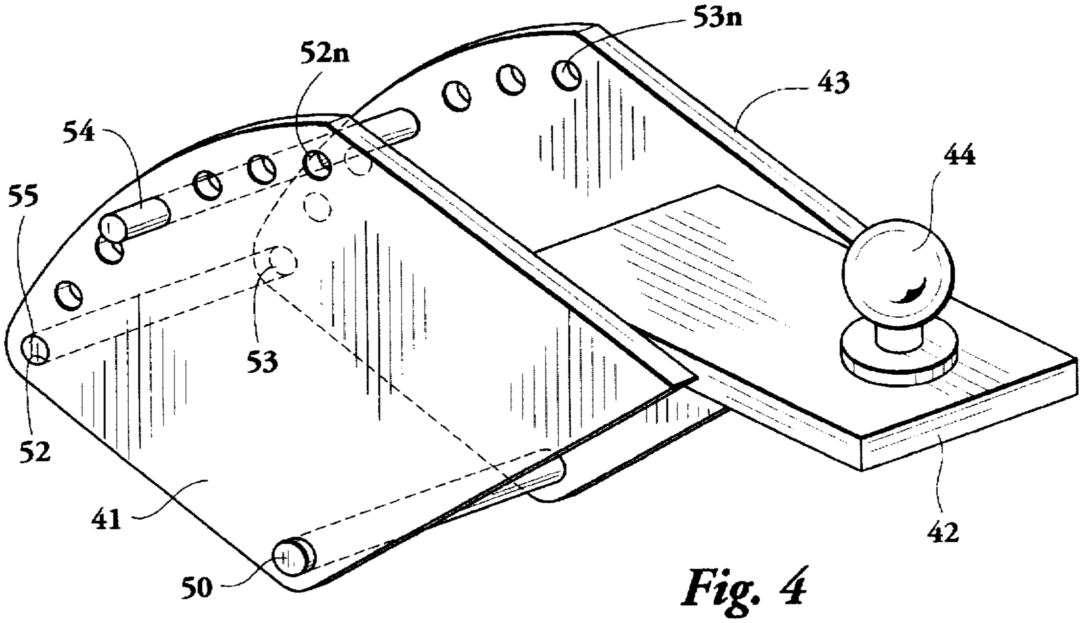
FIG. 4 illustrates a perspective of the support arms and lifting pad unit.

Attention is next directed to FIGS. 1, 2 and 4 for a description of major lifting components. There is a base 10 which supports pump 17 and also inner tube or housing 12 which are preferably welded or otherwise secured to base 10. Pneumatic wheels 36 are each rotatably mounted on a bracket 38 which is secured to the base 10 such as by welding. An outer tube or housing 14 is snugly mounted over inner tube 12. An inner tube roller 16 is mounted at the top of inner tube 12 and rolls along the inner wall of outer tube 14. Likewise an outer tube roller 18 is supported from the outer tube 14 and contacts the outer wall of inner tube 12 as the outer tube is raised and lowered over the inner tube 12.

As shown in FIG. 1, the pump assembly having cylinder 20 is supported from base 10 in a position inside of inner tube 12. Pump shaft 34 is connected by a bolt to mandrel 22 to cross plate 24 which is welded or otherwise secured to outer housing 14. Thus, as the pump 17 applies fluid to the pump cylinder 20, the outer housing 14 is raised and as fluid is removed it is lowered. During this time rollers 18 and 16 provide for smooth travel between the inner and outer tubes. As shown, the housings 14 and 12 are rectangular in cross-section. There is a tool compartment or storage bin 28 above plate 24 which may be covered by lid or top 30. A handle 26 is used for moving the jack assembly. The unit can be tilted back easily onto the tires balancing the unit thus allowing it to be easily rolled to location.

Figure 8:
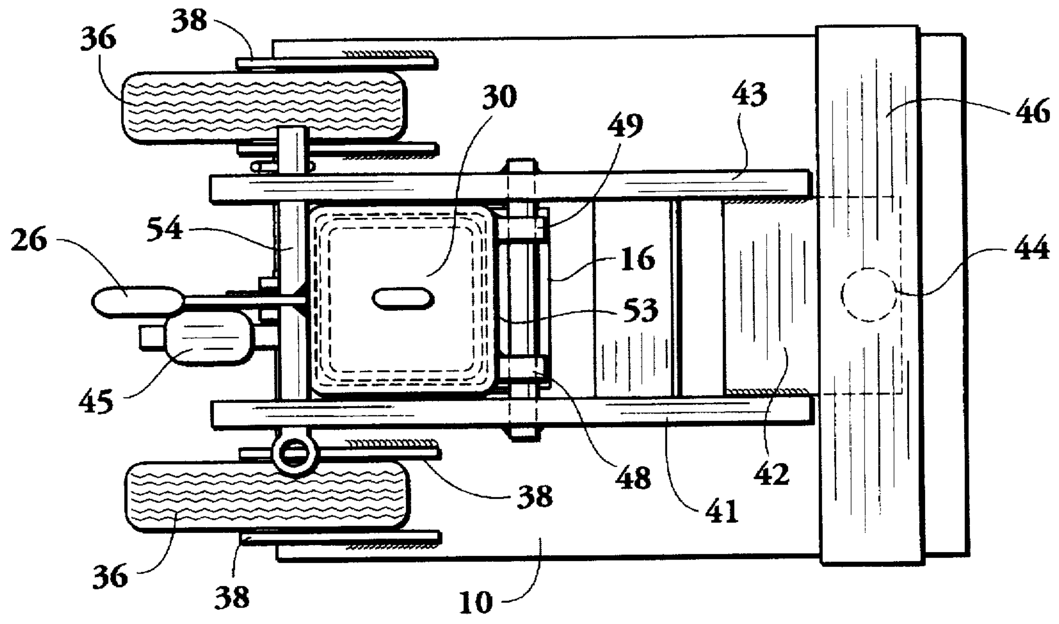
FIG. 8 is a top view of the device taken along the line 8—8 of FIG. 1.
Figure 9:
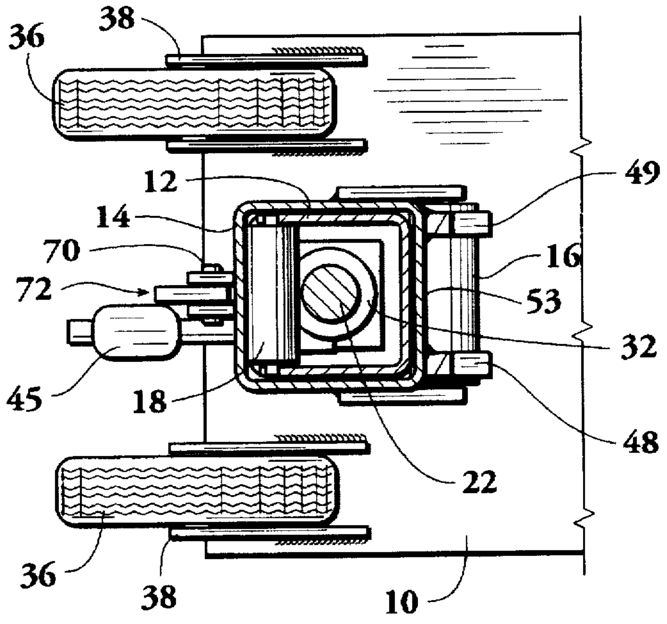
FIG. 9 is a view taken along the line 9—9 of FIG. 1.

I will now discuss how the lift pad 46 is supported from the outer housing 14. Attached to the exterior of the outer housing is a plurality of support catches 48 to 48*n*. As shown in FIGS. 8 and 9 there are two sets of vertically aligned support catch series; namely, 48 and 49. One such series is secured to each edge of the front face 53 of outer housing 14. A lifting pad support unit 40 is shown in FIGS. 1 and 2, and an isometric view of the complete support unit 40 is shown in FIG. 4. As shown in FIG. 4, there are two parallel spaced apart flat support arms 41 and 43. The two plates are secured together by a connecting rod or support pin 50 and a rear support bar 55 which are preferably welded at one end to plate 41 and at the other end to plate 43. A lift pad support plate 42 is welded to end plates 41 and 43. Mounted on support plate 42 is a ball support 44 which in turn supports lift pad 46. A typical lift pad I have built is 2½ inches by 18 inches reinforced steel mounted over a 2 inch diameter steel ball. The rear portions of plates 41 and 43 are provided with height adjustment holes 52 to 52*n* and 53 to 53*n*, respectively.

Support pin 50 can be placed in any one of the catches 48 to 48*n* and in corresponding catches in catch series 49. In FIG. 1, the pin 50 is positioned in the next to lowest catch. In dashed line the pin 50 is in the third catch from top catch 48*n*. In the drawing there are 11 catches 48. A similar number of catches are in catch series 49. However, any desired practical number can be used. As shown in FIG. 1, the pin 54 is in the third position from the bottom of plate 41. Thus, when the load is applied to lift pad 46 the plates 41 and 43 rotate about the pin 50 in catch 48 until pin 54 contacts the back wall or rear side of the outer tube 14. A cotter pin 56 can be used to hold support pin 54 in the selected hole. As load is applied to the lift 46, the plates 41 and 43 are held in a very secure position against outer tube 14. FIG. 1 shows adjustments of vertical position for pin 50 to obtain a plurality of different base elevations for lifting pad 46.

Figure 5:
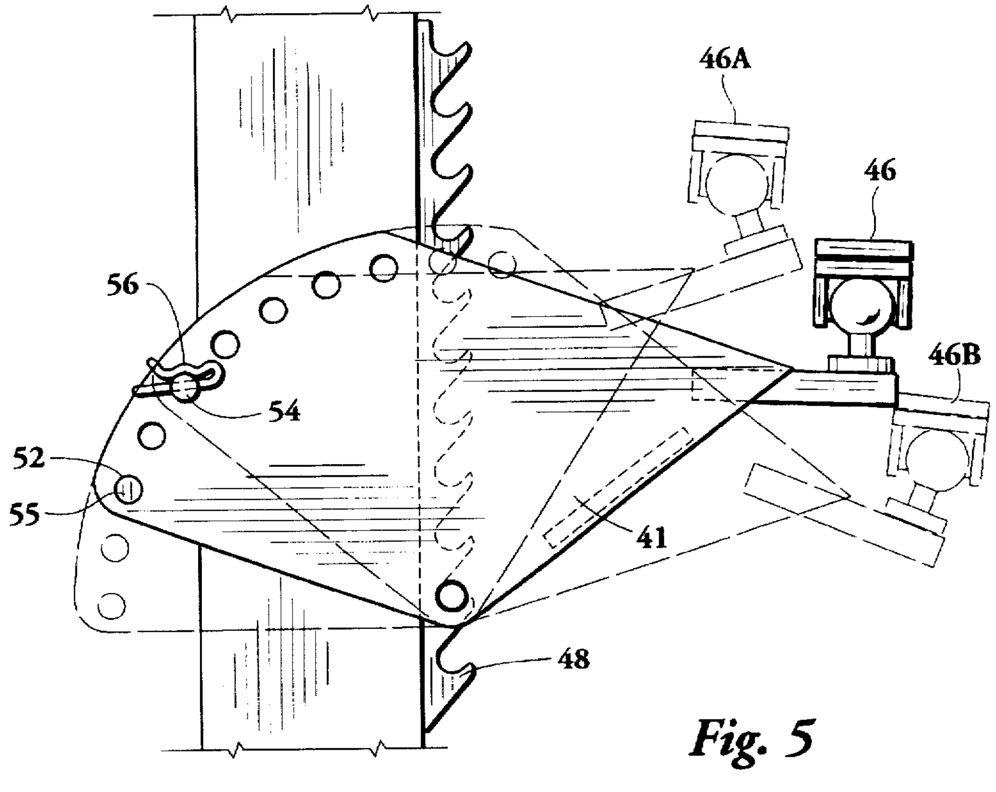
FIG. 5 illustrates various levels or heights of the lifting pad when different height adjustment holes in the rear portion of the lift arms are utilized.

Attention is now directed to FIG. 5 which illustrates increments of level for the lifting pad 46 which can be obtained for each catch of catch series 48 and 49 by leaving the pin 50 in the one catch, as shown herein the second catch from the bottom, and selecting the height adjustment holes through which the pin 54 is inserted. For each base elevation position there are shown seven increment adjustments in the rear of each plate 41 and 43. Pin 54 can be positioned in any pair of holes 52 and 53. If no pin 54 is used, then support bar 55 will contact the rear wall of the outer housing 14 and thus determine the lowermost incremental elevation for the position of the unit in a selected pair of catches 48. By the solid lines lifting pin 54 is indicated as being in the third hole from the bottom and the lifting pad 46 is in one position. If the selecting pin 54 is moved to the fifth hole then the position is that shown in the dashed line position 46*a* of the lifting pad. If no selecting pin 54 is used, then support bar 55 determines the amount of rotation of the arms about pin 50, and the lifting pad is in the lowermost dashed line position 46*a* for one incremental level in the example shown. Thus, for each pair of catches 48 and 49 the elevation or level of lifting pad 46 can have seven such adjustment levels. Any practical number of holes 52 and 53 can be used. In the device shown there are eleven catches and seven holes, including the one in which support bar 55 is welded. Thus, there are seventy-seven level adjustments which can be made using the catches 48 in the proper selection of holes 52 and 53. This is a very wide range of selections of level which the lifting pad may be adjusted and without use of pump 17. Various arrangements, spacings and numbers of the catches 48 and height adjustment holes 52 and 53 can be used to obtain any practical desired incremental level spacing. This aids greatly in the adjustment at the lifting pad with respect to the load.

Figure 3:
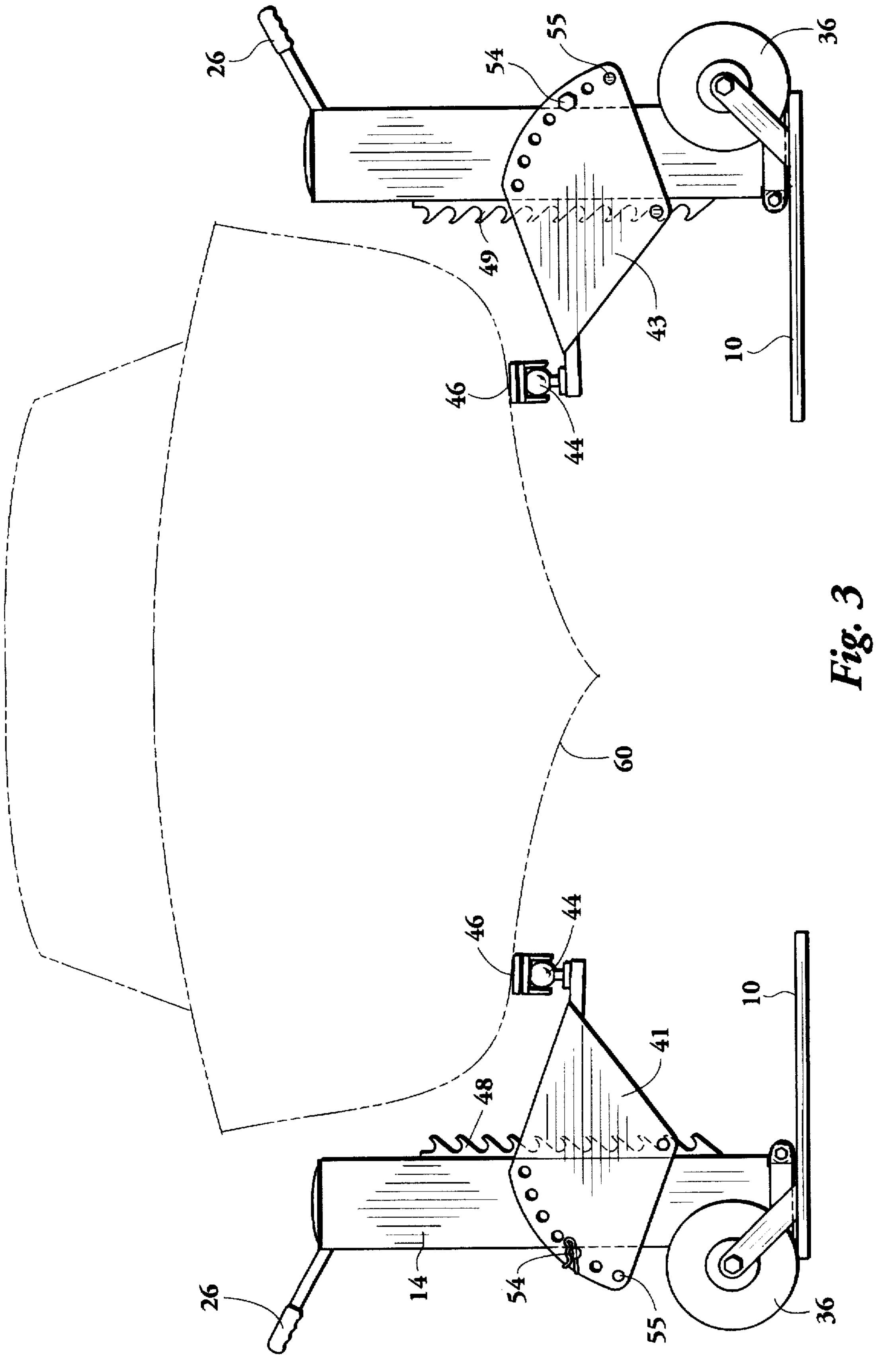
FIG. 3 illustrates two spaced apart jack assemblies for lifting the hull of a boat.
Figure 6:
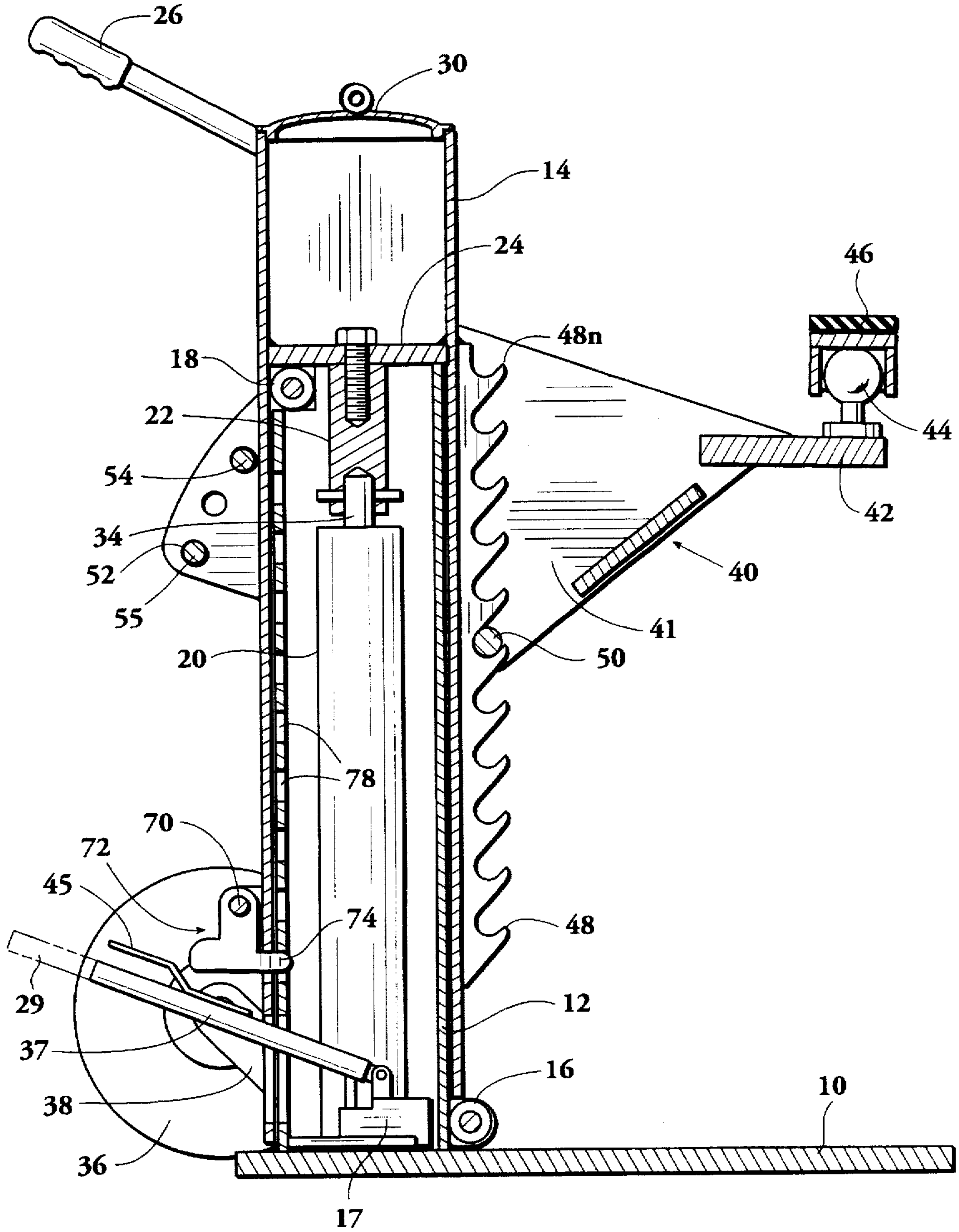
FIG. 6 is a side view partly in section of the jack assembly and especially illustrating the safety latch.
Figure 7:
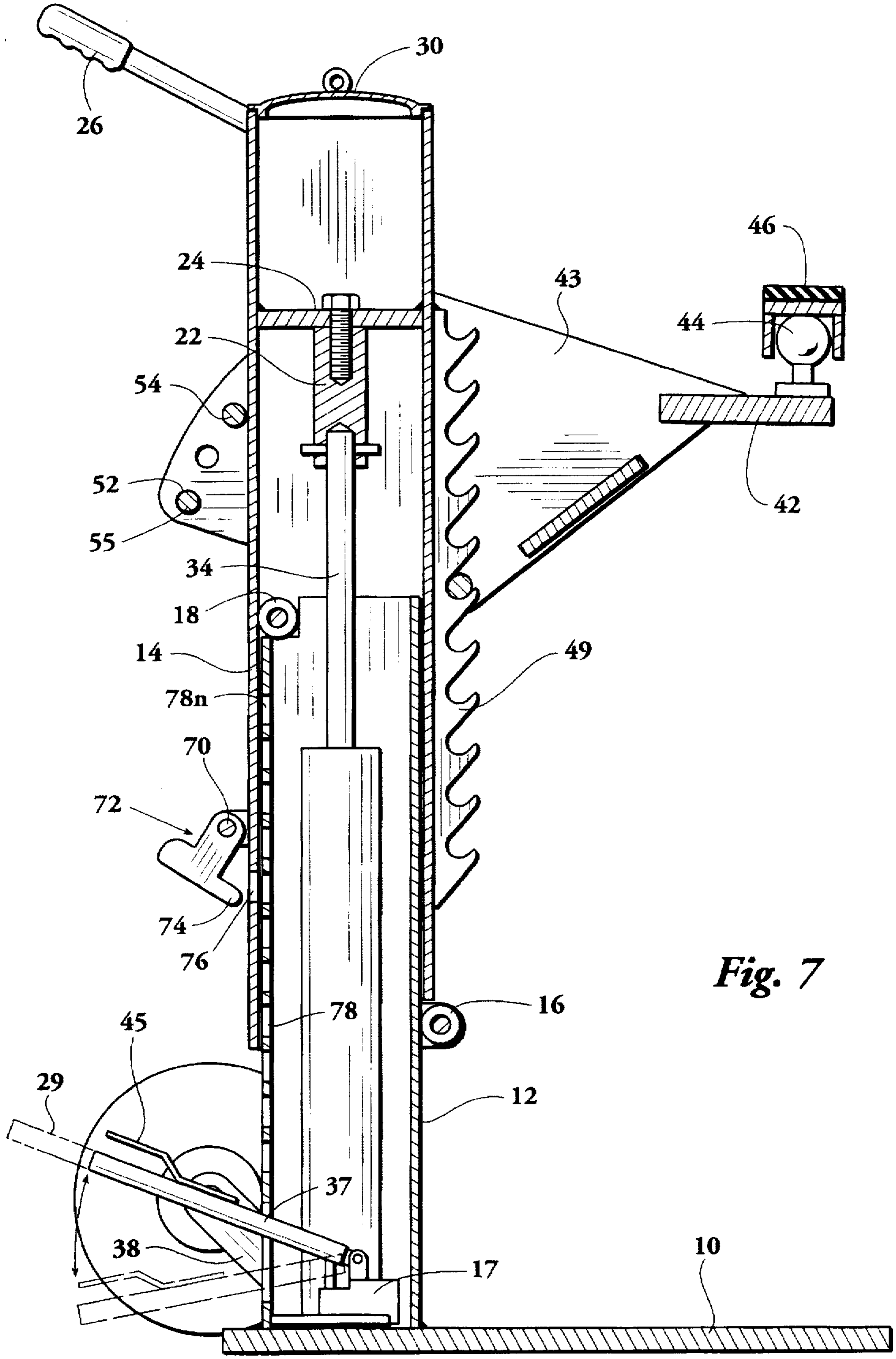
FIG. 7 is similar to FIG. 6 except that the jack is an upper position and the safety latch has been removed from the safety holes.

Attention is next directed to FIG. 3 which shows two jack assemblies with lifting pads 46 contacting the hull of boat 60 for lifting. When so positioned, the jack assemblies may be operated to lift the boat as needed. As shown in FIGS. 2, 6 and 7 the pump 17 may be actuated by a foot pedal 45. By operating the foot pedals 45 with the foot the hands may be used for adjusting the rest of the jack assembly as may be needed. Once the jack assembly is in the position as shown in FIG. 3, operating hand lever extension 29 can be applied to the pump handle and can be of sufficient length to give the required leverage to operate the pump to lift the really heavy loads. The extension 29 may be releasably secured to lever 37 by any suitable means such as by threaded connection.

When lifting heavy objects safety is always a concern which should be addressed. If proper provisions are not made for a hydraulic pump and jack and a leak develops, the device being lifted could fall, causing serious damage to the lifted object or possibly injury to personnel. I have developed a safety latching device which automatically catches when the load is being lowered and will self-release when it is being raised. The latch must be manually released when lowering.

As shown in FIGS. 6 and 7, inner tube 12 is provided with a plurality of vertically aligned holes 78 to 78*n*. Outer tube 14 has a safety catch receiving hole 76 which moves up and down with the outer housing or tube with respect to holes 78 and is vertically aligned therewith. Safety latch 72 is pivoted about pivot 70 which is supported from the outer tube 14. It is provided at the lower end with a projection or safety catch or finger 74. When hole 76 is aligned with a hole 78 in the inner tube, safety finger 74 enters through both holes as shown in FIG. 6. Finger 74, hole 76, and holes 78 are so sized that finger 74 can, in operation, easily enter and be easily removed from holes 78. When in this position, if the hydraulic pump should fail or there becomes a leak in the system somewhere, the safety finger 74 would remain in the position shown in FIG. 6. The force on the outer tube 14 is a downward force and holds the extension finger 74 securely against the lower portion of hole 78 in the position shown in FIG. 6. When the device is being lifted there is no load on safety latch 74 and the lever 72 rotates about pivot 70 to pull the projection 74 out of hole 78 in the inner tube 12. Thus, during the lifting operations the latch 72 will release and permit the outer tube 14 to be raised. However, on the downward movement, the force from outer tube through pivot 70 causes the projection or finger 74 to be wedged against the bottom of the hole 78, thus maintaining a safety feature. If it is desired to lower the outer tube 14, then before the pressure is released on the pump, the unit 72 is rotated manually to remove the fingers 74 from hole 78. Then lowering can proceed.

There are many advantages and unique features of this jack assembly described herein. For example, with the series of catches 48 and 49 and the unique structure of the support units 40, increments of variations in the level of the lift pad is very small, e.g., can be down to about one-quarter inch or less. This gives fine adjustment of the level of the lifting pad before the pump unit is operated. In a particular example given, there are seventy-seven incremental adjustment levels. In other designs of my invention by varying the arrangement of the holes 52 any practical number of increments of level adjustments can be obtained. Further, the safety latch device will automatically catch when lowering and will self-release while the outer tube 14 is being raised. On the other hand, when the outer tube 14 is being lowered, the latch must be manually released before lowering can occur.

Thus, it is apparent that there has been provided, in accordance with the invention, a lifting jack that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A jack assembly comprising:

a base;

an outer housing having a front and rear side;

a height adjusting unit having;

(i) a first vertical series of support catches supported by the front side of said outer housing;

(ii) a second vertical series of support catches supported by the front side of said outer housing and spaced from a first series;

(iii) a first support arm having a front and a rear side with a first series of height adjusting holes along said rear side;

(iv) a second support arm having a front and a rear side with a second series of height adjusting holes in said rear side;

(v) a catch positioning support rod connecting said first and second support arms and of a size to fit into support catches of said first and second support catches series;

(vi) a hole selection rod extending between said first and second support arms and positionable into said series of holes;

(vii) a lift pad supported from said support arms; means to lift said outer housing with respect to said base.

2. A jack assembly as defined in claim 1 in which said means to lift includes a hydraulic jack supported from said base including a lever for operating said hydraulic jack;

a foot assist means, and an arm extension means interchangeably usable to operate said lever of said hydraulic jack.

3. A jack assembly as defined in claim 1 including a plate in said outer tube forming a storage bin.

4. A jack assembly as defined in claim 3 including an inner tube roller supported from said inner tube positioned such that it said inner tube roller rolls along the inner wall of said outer tube as it said inner tube roller is lifted.

an outer tube roller supported from said outer tube and positioned to roll along said inner tube when said outer tube is lifted thereover.

5. A jack assembly as defined in claim 3 including a support bar extending between the rear sides of each said support arms and welded thereto.

6. A jack assembly comprising:

a base;

an inner tube secured to said base;

an outer tube having a rear side and a front side and mounted about said inner tube and movable in relation therewith;

a jack mounted within said inner tube and supported from said base and having an extension shaft;

means for connecting said jack extension shaft to said outer tube such that lifting said extension shaft lifts said outer tube as said jack extension shaft is extended;

at least one pair of spaced apart support catches on said outer tube front;

a height adjusting system including a first support arm and a second support arm each arm having a front end and a rear end and a first support bar connected between said arms and supported in a selected position by said support catches, and a plurality of height adjusting holes in the rear end of each said arm;

a list pad supported by said support arms; and a hole selecting rod selectively extendable through said holes to adjust the height of said lift pad.

7. A jack assembly as defined in claim 6 including:

a safety latching device including a plurality of vertical holes in said inner tube, a hole in said outer tube, a pivot supported from said outer tube above said hole in said outer tube, a latch arm pivotally supported from said pivot and having a latching finger extendable through said hole in said outer housing and into an aligned hole in said inner housing, said latching arm having a center of gravity such that gravity forces the latching arm to rotate about said pivot in a direction to cause said latching fingers to enter said hole.

8. A jack assembly as defined in claim 7 in which said lift pad is pivotally supported from said support arms.

9. A jack assembly comprising:

a base;

an outer tube;

a jack means supported from said base and capable of lifting said outer tube;

a lift pad supported from said outer housing;

a frame supported from said base for guiding said outer tube as it is raised and lowered, a series of aligned vertical holes in said frame;

a hole in said outer tube aligned in the same vertical plane with said holes in said frame;

a pivot supported from said outer tube;

a safety lever pivotally supported from said pivot and having an engaging finger of a size to enter said hole in said outer tube and an aligned hole in said frame, said safety lever having a center of gravity such that it pivots about said pivot by gravity forcing said finger through said outer tube hole and into said frame hole when the holes are aligned, such that the safety lever will automatically catch when lowering the outer tube and will self-release when the outer tube is raised but is of a structure such that it must be manually released when lowering.

10. A jack assembly including a lift pad for lifting a load which comprises:

a base;

a vertically movable frame having a front and a rear portion;

a jack for moving said frame vertically and with respect to said base;

at least one series of vertical catches mounted on the front portion of said frame;

a height adjusting system including:

a first support arm and a spaced apart second support arm, a support red fixed to each said support arm and insertable into one of said catches on the front of said frame, a plurality of height adjusting holes in each said support arm, a hole selecting rod extendable through said holes, said rod contacting the rear of said frame upon sufficient rotation of said arms about said support rod, means connecting a part of the front end of said support arms to said lift pad.

11. A lifting jack as defined in claim 10 in which each said arm is substantially trapezoidal in shape and having a forward corner, a rear corner, and a bottom corner, said support rod connecting the bottom corners of said arms.

12. A lifting jack as defined in claim 10 including a rear support bar positioned along the rear portion of said frame and welded to each said support arm.

* * * * *